UNITED STATES PATENT OFFICE.

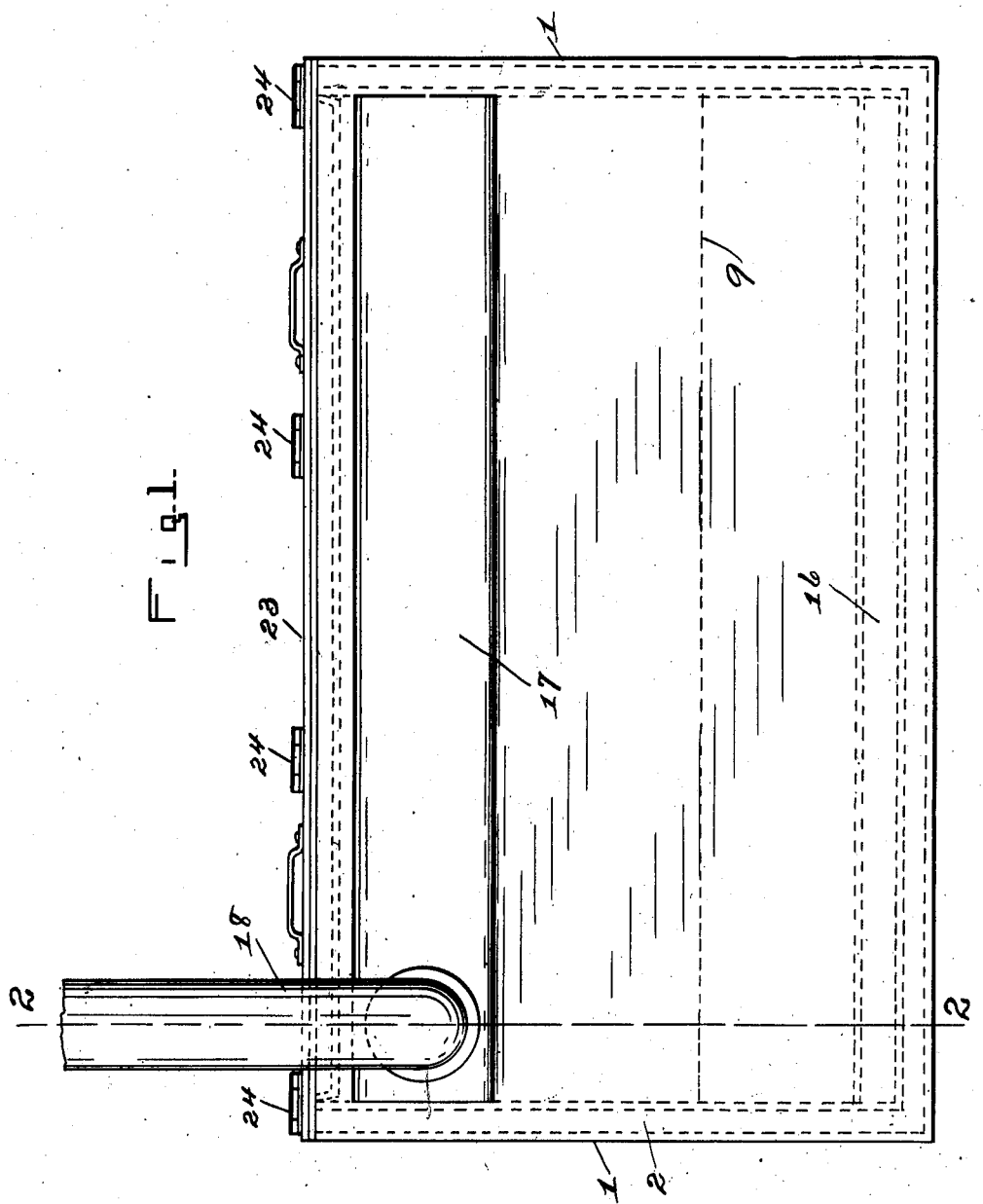

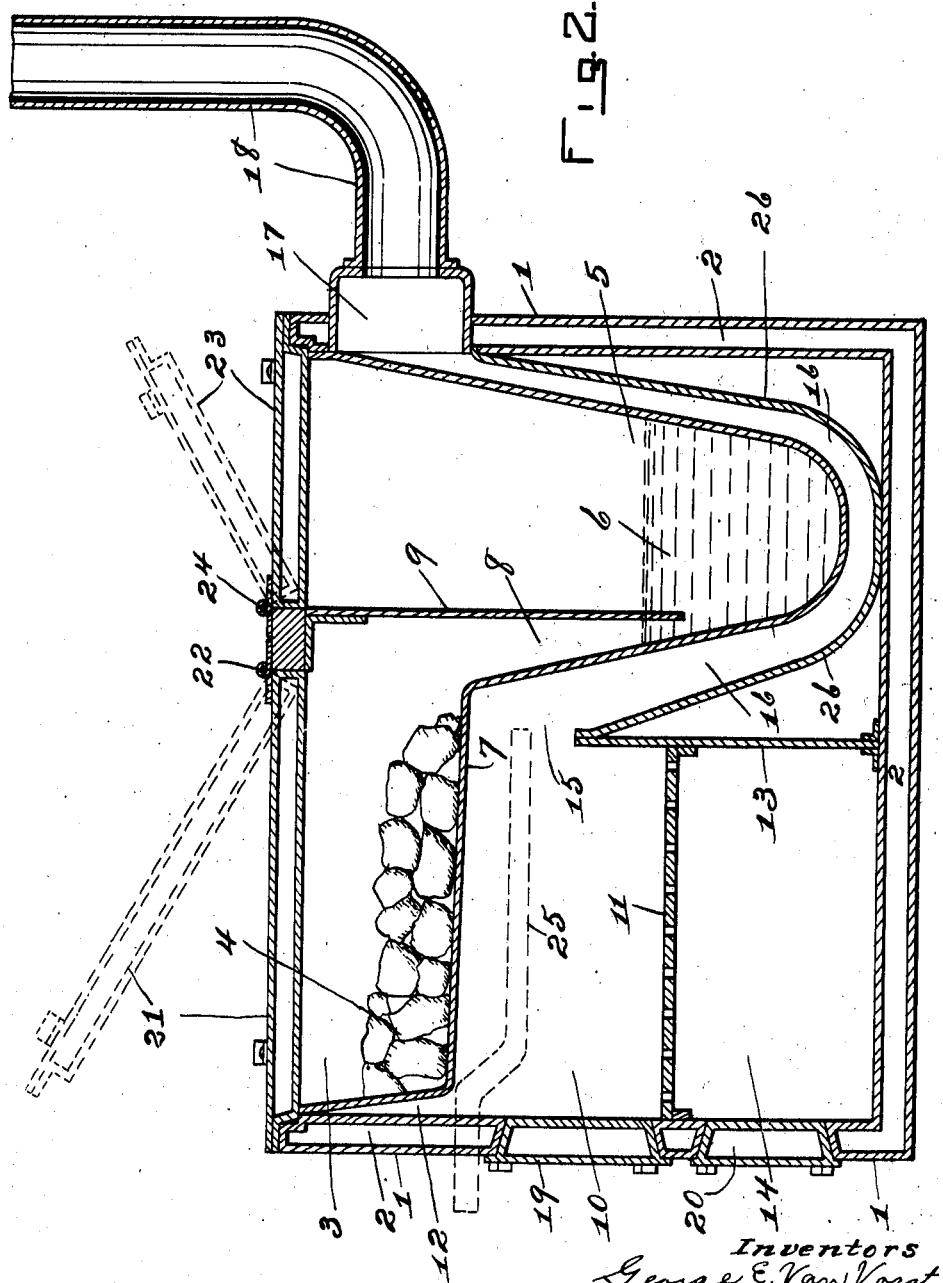

GEORGE E. VAN VORST AND JOHN VAN VORST, OF SCOTIA, NEW YORK.

MELTING-KETTLE.

1,355,931.

Specification of Letters Patent.  Patented Oct. 19, 1920.

Application filed February 4, 1920. Serial No. 356,146.

*To all whom it may concern:*

Be it known that we, GEORGE E. VAN VORST and JOHN VAN VORST, citizens of the United States of America, residing at Scotia, county of Schenectady, and State of New York, have invented certain new and useful Improvements in Melting-Kettles, of which the following is a specification.

Reference may be had to the accompanying drawings, and the reference characters marked thereon, which form a part of this specification. Similar characters refer to similar parts in the several figures therein.

This invention relates to improvements in apparatus for melting tar, pitch and the like.

Certain objects of the invention are to more quickly obtain a useful supply of the melted material; to maintain the supply of melted material at a substantially uniform and safe temperature; to prevent burning of the melted material and to prevent or minimize the fouling of the apparatus by burned-on deposits.

Other objects will appear in connection with the following description.

Figure 1 of the drawings is a view in rear elevation of a melting-kettle embodying our invention.

Fig. 2 is a vertical cross-section of the same taken on the broken line 2—2 in Fig. 1.

Referring to the drawings wherein the invention is shown in preferred form, 1 is an inclosure, having double walls with an air-space, 2, between the walls whereby escape of heat from the inclosure is largely prevented.

Within the inclosure is a melting-chamber, 3, adapted to receive the more or less solid tar or pitch, 4, and a retaining chamber, 5, adapted to receive and retain ready for use the melted tar or pitch, 6.

The retaining-chamber, 5, extends below the bottom, 7, of the melting-chamber, and the two chambers are connected together by a passageway, 8, extending downward from the lower end of the bottom, 7, of the melting-chamber, which bottom is downwardly inclined toward said passageway, 8.

A partition, 9, separates the upper portion of the retaining-chamber, 5, from the melting-chamber and extends downward a substantial distance below the bottom of the melting-chamber.

Directly beneath the bottom of the melting-chamber is a fire-box, 10, shown provided with a grate, 11, for the burning of wood or coal.

The outer side wall of the melting-chamber is spaced away from the neighboring wall of the inclosure at 12, to which space the fire-box is open, so that the gases from the fire-box cause said side wall of the melting-chamber to be highly heated.

A partition, 13, is erected from the bottom of the inclosure extending above the grate, 11, forming the inner side wall of the fire-box and also the inner side wall of an ash-pit, 14, beneath the grate, 11.

Between the upper end of the partition, 13, and the bottom of the melting-chamber, is an opening, 15, from the fire-box into a flue-space, 16, which flue-space extends downwardly from said opening, 15, around the bottom of the retaining-chamber, 5, and upwardly between the outer side of the retaining-chamber and the neighboring wall of the inclosure to a flue-manifold, 17, connected with a smoke-pipe, 18.

Said flue-manifold, the retaining-chamber, 5, melting-chamber, 3, flue-space, 16, and the fire-box and ashpit preferably extend substantially from end to end of the inclosure.

The partition, 9, forms one wall of the passageway, 8, the opposite wall of which passageway forms a wall of said flue-space, 16, being directly exposed to the gases passing from the fire-box through the opening 15.

The inclosure is provided with an opening leading to the fire-box which opening is closed by door, 19, and with an opening leading to the ash-pit which latter opening is closed by a door, 20.

The melting-chamber is accessible through an opening in the top of the inclosure closed by a door or lid, 21, hinged at 22, and the retaining-chamber is accessible through an opening in the top of the inclosure closed by a door or lid, 23, hinged at 24.

In the use of the apparatus, a fire is started in the fire-box and a quantity of more or less solid tar, pitch or the like is deposited within the melting-chamber, 3, supported by the bottom, 7, of said chamber.

The flames and heated gases from the combustion of the fuel in the fire-box impinge upon the bottom, 7, and the outer side wall of the melting-chamber, causing the portions of the tar or pitch in contact with, or closely adjacent to, said bottom, 7, to be quickly melted.

As rapidly as the tar or pitch becomes melted it flows from the bottom of the melting-chamber down through the passageway, 8, into the retaining-chamber, 5.

In passing down through the passageway, 8, the melted material is brought into contact with the wall of the passageway, 8, which is exposed directly to the flames and heated gases passing from the fire-box through the opening, 15, so that the material is delivered to the retaining-chamber, 5, in melted or liquid form suitable for use.

The products of combustion in passing from the fire-box to the flue-manifold, 17, traverse the flue-space, 16, in contact with the bottom portion and the outer side wall of the retaining-chamber, 5, whereby a continuous supply of heat is transmitted to the melted material, 6, which serves to maintain said material at a proper temperature for use.

The material is removed from the retaining-chamber, 5, for use as desired by means of any suitable dipping device.

The bottom of the melting-chamber being directly over the fire-box and exposed to the flames and hot gases contained within the fire-box becomes highly heated and causes the more or less solid tar or pitch to be very quickly melted by contact therewith, but inasmuch as the tar or pitch flows from the bottom of the melting chamber down through the passageway 8, as fast as melted, the material does not become scorched or burned by the highly heated bottom of the melting-chamber.

The waste gases passing through the flue-space, 16, while of a sufficiently high temperature to maintain the melted material in the retaining-chamber at a proper and safe temperature for use, are not of such temperature as to burn or scorch the melted material or cause the same to be burned or incrusted upon the inner surface of the melting-chamber.

Our improved apparatus therefore has many advantages over the ordinary form of melting kettle in which both the more or less solid and the melted material are contained within the same chamber and in which it frequently happens that the material first melted becomes overheated and burned and incrusted upon the inner surface of the chamber before other portions of the material have become melted.

In the use of our apparatus it is not necessary to wait until all of the material has been melted but by maintaining the supply of more or less solid material in the melting-chamber, 3, a continuous supply of melted material at proper and safe temperature may be delivered to and retained in the retaining-chamber, 5.

The fire-box, 10, may be adapted for the burning of any desired kind of fuel, and may if desired be provided with a burner, 25, indicated by dotted lines in Fig. 2, for burning gas or coal.

We have shown the outer wall of the flue-space, 16, formed by a partition, 26, in order to confine the waste gases closely to the outer surface of the retaining chamber, but if desired said partition may be omitted, as for certain purposes of the invention, the partition, 13, and the bottom and rear wall of the inclosure will sufficiently confine said gases in their passage from the fire-box to the flue-manifold or smoke-pipe.

The partition, 9, prevents any flame from passing from the melting-chamber to the retaining-chamber should the material in the melting-chamber become ignited.

While we have described our apparatus as used for melting tar or pitch, it will be understood that it is adapted for melting or reducing by heat from solid or semisolid to liquid form various substances, and is particularly adapted for and convenient for use in melting roofing materials such as asphalt.

What we claim as new and desire to secure by Letters Patent is—

1. A melting-kettle having a melting-chamber, a fire-box beneath the melting-chamber, a retaining-chamber extending below the bottom of the melting-chamber, a passageway extending downwardly from the melting-chamber to the retaining-chamber, and an outlet-flue for the fire-box extending downwardly therefrom around the bottom of the retaining-chamber.

2. A melting-kettle comprising an inclosure having therewithin a melting-chamber, and a retaining-chamber extending below the level of the melting-chamber, said chambers being separated by a partition extending below the bottom of the melting-chamber, a passageway, one wall of which is formed by said partition, extending downwardly from the melting-chamber to the retaining-chamber, and an outlet-flue for the fire-box formed in part by the opposite wall of said passageway and by the bottom of the retaining-chamber.

3. A melting-kettle having a melting-chamber, the bottom of which is downwardly inclined, a fire-box beneath the melting-chamber, a retaining-chamber extending below the bottom of the melting-chamber, a passageway extending downwardly from the lower end of the bottom of the melting-chamber to the retaining-chamber, and an outlet-flue for the fire-box extending downwardly along the side of said passageway around the bottom of the retaining-chamber.

4. A melting-kettle comprising an inclosure having therewithin a melting-chamber, a fire-box beneath the melting chamber, a retaining-chamber extending below the melting-chamber between the fire-box and an end-wall of the inclosure with a flue space between the outer side of the retaining-chamber and said wall of the inclosure and between the bottom of said retaining chamber and the bottom of the inclosure, a partition erected from the bottom of the inclosure extending upwardly to form the inner wall of the fire-box with an opening thereabove communicating with said flue-space, and a passageway extending downwardly from the melting-chamber past said opening to the retaining-chamber.

5. A melting-kettle comprising an inclosure having a melting-chamber, a retaining-chamber extending below the bottom of the melting-chamber, a passageway extending downwardly from the melting-chamber to the retaining-chamber, a flue-manifold projecting outwardly along the upper portion of the wall of said inclosure on the outer side of said retaining-chamber, a smoke-pipe leading from said manifold, and an outlet-flue for the fire-box extending downwardly therefrom around the bottom of the retaining-chamber to said flue-manifold.

6. A melting-kettle comprising an inclosure having a melting-chamber, a fire-box beneath the melting-chamber, a retaining-chamber extending below the bottom of the melting-chamber, a passageway extending downwardly from the melting-chamber to the retaining-chamber, and an outlet-flue for the fire-box extending downwardly therefrom around the bottom of the retaining-chamber, said melting-chamber and said retaining-chamber being accessible through separate door-closed openings in the top of the inclosure.

7. A melting-kettle comprising an inclosure having a melting-chamber the outer wall of which is spaced from the neighboring side-wall of the inclosure, a fire-box beneath the melting-chamber open to said space between the outer wall of the melting-chamber and the neighboring wall of the inclosure, a retaining-chamber extending below the bottom of the melting-chamber, a passageway, extending downwardly from the melting-chamber to the retaining-chamber, and an outlet-flue for the fire-box extending downwardly therefrom around the bottom of the retaining-chamber.

In testimony whereof, we have hereunto set our hands this 2nd day of February, 1920.

GEORGE E. VAN VORST.
JOHN VAN VORST.